US006400880B1

(12) United States Patent
Hebert et al.

(10) Patent No.: US 6,400,880 B1
(45) Date of Patent: Jun. 4, 2002

(54) DEGRADABLE OPTICAL FIBER AND A METHOD FOR ITS PREPARATION

(75) Inventors: Jean-Pierre Hebert, Chatillon; Frédéric Donnaint, Clamart, both of (FR)

(73) Assignee: Aerospatiale Matra, Paris (FR)

(*) Notice: Subject to any disclaimer, the term of this patent is extended or adjusted under 35 U.S.C. 154(b) by 0 days.

(21) Appl. No.: 09/542,249

(22) Filed: Apr. 3, 2000

(30) Foreign Application Priority Data

Apr. 7, 1999 (FR) .............................. 99 04332

(51) Int. Cl.$^7$ ................................ G02B 6/02
(52) U.S. Cl. ..................................... 385/128
(58) Field of Search ................ 385/128, 141, 385/145; 244/3, 12

(56) References Cited

U.S. PATENT DOCUMENTS 5,482,520 A  1/1996  Alam et al. .................. 44/336

FOREIGN PATENT DOCUMENTS

| DE | 197 12 253 | 10/1998 |
| WO | WO970528 | 2/1997 |

*Primary Examiner*—Akm E. Ullah
*Assistant Examiner*—Michael Stahl
(74) *Attorney, Agent, or Firm*—Burns, Doane Swecker & Mathis LLP

(57) ABSTRACT

This invention relates to a self-degradable optical fiber, that is to say, an optical fiber that contains, within its own structure, compounds capable of leading to its degradation. This optical fiber comprises a core, a sheath and a polymer coating, in which at least one calixarene is incorporated in the coating, the calixarene(s) imprisoning at least one compound capable of being released under defined conditions of temperature and/or humidity and/or irradiation and of bringing about degradation of the coating. The invention also relates to a method of preparing this fiber and a wire guided device comprising this fiber.

36 Claims, 3 Drawing Sheets

DEGRADABLE OPTICAL FIBER AND A METHOD FOR ITS PREPARATION

This invention relates to a degradable optical fiber. More precisely, the invention relates to a self-degradable optical fiber, that is to say, an optical fiber that contains, within its own structure, compounds capable of leading to its degradation.

The invention also concerns a method of preparing said fiber.

The technical field of the invention can be defined as that of optical fibers in general, and particularly optical fibers used for the guidance of various devices.

It is known that, today, optical fibers have acquired considerable importance in all industrial fields, such as telecommunications, opto-electronic components, sensors and lasers among others.

The traditional structure of an optical fiber comprises a core, a sheath surrounding this core and finally a coating or protective layer made of an organic polymer intended to protect the core silica and the optical sheath, notably from ambient humidity, and enables the fibers to preserve their mechanical properties.

The optical fibers have the advantage of being insensitive to the surrounding medium, compact and simple to manufacture.

These properties have been put to good use, particularly in the field of devices guided by wires and notably, wire guided missiles. In effect, the optical fibers have mechanical and optical properties which are very little affected by attack due to various external agents. Consequently, the optical fibers ensure stable video transmissions of good quality, so that, for example, it allows the person firing the device to observe the area being flown over by the missile and then to guide it to its target.

Hence, the optical fibers are themselves not very sensitive to electromagnetic radiation, to thermal stresses such as those caused, for example, by passage within the jet of hot gas discharged by the missile engine, and finally, the fiber is also very resistant to corrosion under stress and to chemical and physical aging.

It has proved to be the case that long term storage of optical fibers under extreme conditions of relative humidity and temperature poses no problem whatsoever and does not cause any significant degradation in its mechanical or optical properties.

Nevertheless, this excellent resistance or virtual insensitiveness of the optical fibers to electromagnetic, thermal, mechanical, chemical or any other attack met with in the natural environment which has just been described, has a number of disadvantages. In particular, in the case where the optical fiber is used to guide a device, such as a missile, after the unwinding of the optical fiber spool fitted to the missile, the fiber remains on the ground in a random fashion in relation to the geometry of accidents of the terrain, natural obstacles, vegetation and various buildings.

The presence of optical fibers of great length, the sheath of which has a high mechanical strength, may constitute a nuisance for personnel called upon to move over the terrain, possibly using various vehicles, a short time after firing the missiles. The optical fibers are also a source of potential restriction for personnel who are close to or on the firing ground.

In addition, these practically non-degradable fibers will constitute a long term source of pollution for the natural environment.

It is known to degrade used optical fibers by various mechanical and/or chemical treatments. However, such methods cannot be used on fibers of great length, spread out over a large surface area, in a natural environment, these fibers generally having to be degraded within a relatively short space of time.

Therefore, there is a requirement for an optical fiber comprising a core, an optical sheath and a coating which can be simply and rapidly degraded at the end of its use, without its previous optical or mechanical properties being affected.

In particular, there exists a need for an optical fiber, intended notably for the guidance of wired guided devices, such as missiles, the optical and mechanical properties of which are preserved during its storage and up to the end of its use, and which, under all possible climatic conditions is, at the end of this, able to self-degrade sufficiently within a defined period of time.

By degradation, one understands notably a loss of mechanical properties capable of leading to a degradation of the coating and then to the destruction or disintegration of the optical fiber.

The aim of the invention is therefore to provide an optical fiber comprising a core, an optical sheath and a coating made of an organic polymer which responds to the list of requirements mentioned above, which does not have the drawbacks, limitations, defects and disadvantages of existing optical fibers and which resolves the problems posed by these optical fibers.

This aim and others are achieved conforming to the invention by an optical fiber comprising a core, an optical sheath and a polymer coating, in which at least one calixarene is incorporated in said coating, said calixarene(s) imprisoning at least one compound capable of being released under defined conditions of temperature and/or humidity and/or irradiation and of bringing about degradation of said coating.

By degradation, one understands generally according to the invention, first and foremost, breaks spaced apart here and there on the fiber, for example, at the end of its unwinding, that is to say that the fiber no longer comprises very long strands, of a length, for example, greater than 500 m.

According to the invention, this process of degradation of the fiber, revealed by intermittent breaks in the fiber here and there, has progressed sufficiently, at the end of a desired time, for the fiber no longer to present a nuisance to personnel. This process of degradation may then progress, but more slowly, as a function of the conditions of the natural environment, possibly until the quasi-total degradation of the fiber.

According to the invention, said at least one calixarene is to be found included in the coating of the optical fiber.

Calixarenes are compounds of the oligomeric cyclic phenol type used mainly in super-molecular chemistry and in which the successive phenol rings are linked through a —$CH_2$— group in the ortho position (positions 2, 5).

These compounds have excellent compatibility with all types of polymers, in particular organic polymers, such as the polymers used for the coating of the optical fiber.

In other words, calixarenes do not react with said polymers, particularly organic polymers, under their general conditions of use, which proves to be particularly important, notably in the case where the optical fiber is a fiber used for guiding missiles and other guided equipment, since then, no degradation of the polymer and therefore of the fiber occurs under the action of the calixarene, in particular under the conditions of storage.

In addition, the presence of phenol rings in the structure of the calixarenes also implies a very high thermal stability which is surprising for organic molecules.

This property is also put to good use in the invention since heating of the fiber, for example, due to the firing of the missile ought not therefore to have an impact on the properties and the effects of the calixarenes.

The calixarenes included in the coating of the optical fiber are, according to the invention chosen, preferably from among known calixarenes, comprising 4 to 10 phenol rings, preferably 4, 5, 6 or 8 phenol rings, that is to say calix[4]arene, calix[5]arene, calix[6]arene or calix[8]arene.

These calixarenes may possibly be substituted by one or more substituent groups chosen, for example, from among the linear or branched alkyl groups, alkenyl, aryl and aralkyl groups.

Preferably, said calixarene is chosen from among the calixarenes in which all the phenol rings are substituted in the para position by one and the same substituent chosen, for example, from among the linear or branched alkyl groups with from 1 to 6 carbon atoms. Preferably said alkyl group is a tert-butyl group.

The preferred calixarenes according to the invention will therefore be the t-butyl calixarenes, for example, t-butyl calix[6]arene of formula [I]:

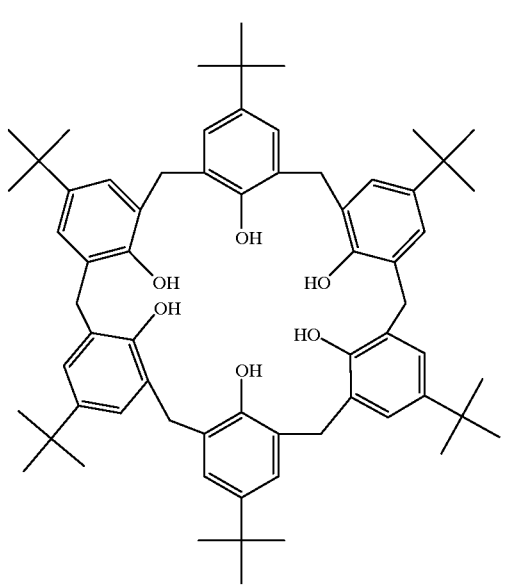

(I)

Calixarenes are generally represented by a basket or a cage capable of imprisoning a molecule.

The dimensions of this basket can be modulated according to the number of phenol molecules making it up and can therefore be matched to the size of the molecule of the compound to be liberated or a substrate.

The calixarene constitutes the receptor. The receptor molecules are linked to one another by covalent bonds which are very strong and difficult to break. In contrast to this, the substrate is linked to the receptor, that is to say to the cage in which it is imprisoned by secondary bonds of the Π—Π type, which are much easier to break and which finally enables the substrate to be released.

In the case of the invention, the substrate is constituted by at least one molecule or other chemical entity of at least one compound capable of being released under defined conditions of temperature and/or humidity and/or irradiation and of bringing about degradation of the coating.

Each molecule of calixarene can imprison a single molecule or chemical entity or several molecules or chemical entities of the compound or compounds. Depending on the dimensions of the calixarene, for example, 2, 3, 4, 5 or 6 molecules or chemical entities which may be identical or different, could be imprisoned inside the calixarene.

A final advantage of calixarenes is the fact that they can be produced industrially on a large scale and at moderate cost by known and proven methods. Because of this, their incorporation into the coating of the optical fiber has practically no effect on the price of these fibers.

According to the invention, it has been possible to show, in a surprising manner, that the calixarenes could release, for example, the molecule or molecules of the compound or compounds that they are imprisoning under defined conditions of humidity and/or temperature and/or irradiation, that is to say that the release of the imprisoned molecules or chemical entities only occurs under well defined conditions, and only when the optical fiber and, in particular, its coating are exposed to these specific conditions.

It has been possible to show, for example, that the release of said molecules or chemical entities could occur under defined combined conditions of temperature and humidity, preferably these combined conditions being conditions of high temperature and humidity.

Hence these conditions will generally be defined by a temperature greater than 60° C., and are notably those created by the heating of the fiber during its unwinding, due to friction, for example against the cowl, inside which the fiber was confined and to its passage within the jet of warm gas at the outlet of the jet engine of a wire guided device.

The humidity conditions combined with these temperature conditions are similarly those that prevail notably at the outlet of this same jet engine.

In addition and preferably, the release of said molecules or chemical entities occurs under the action of irradiation, preferably ultra-violet irradiation, that is to say that in the preferred embodiment according to the invention, the combination of these three factors is necessary to cause the release of the compound in the form of one or more molecules or chemical entities and hence initiate the degradation of the coating.

It is possible, according to the invention, on the one hand, thanks to the calixarenes, to carry compounds causing the degradation of the coating to the inside of the polymer without its essential properties and those of the optical fiber being affected and, on the other hand, to trigger the release of said molecules only when the fiber is subjected to the specified conditions indicated above.

Similarly the release of the compounds in the coating, sets in motion the process of degradation of the fibers which nevertheless does not at first affect the properties of these fibers while they are being put to effective use, but which will be completed after this use within a convenient time period, for example, within a time period of the order of a few hours, preferably a time less than or equal to six hours.

The conditions of humidity and temperature which trigger the release of the compound by the calixarenes are precisely those met with at the outlet from the engines of the guided devices, such as the jet engines of missiles.

In effect, the water vapor is present a short distance from the missile in the exhaust gas from its jet engine and the fiber will pass within such a zone.

The process of degradation is only activated when the missile is fired—namely, for example, at the outlet from the container where it was stored—and at the time the fiber is being unwound.

The process is not however as fast as that that would occur if the compound leading to the degradation had been present in the coating (not imprisoned in a calixarene). Because of the inclusion of these molecules or chemical entities in calixarenes, the release is progressive and controlled and all the properties, particularly of transmission and of strength, required by the optical fiber during the flight of the missile, are preserved.

Once the fiber has fulfilled its guidance role, the degradation indicated by a significant decrease in the mechanical strength of the fiber progresses and is complete within the desired time delay, for example, in a few hours, notably in less than six hours.

Regarding what one understands by the word degradation in the sense of the invention, one should refer to the definition given above.

In other words, the problem which is the reason for the invention, which is that of the degradation of optical fibers, particularly those used for guiding wire guided devices, such as missiles, is resolved by the inclusion of calixarenes in the coating of the fiber.

The optical fibers according to the invention are self-degradable within the desired time span, and, with the help of a "trigger" that is particularly matched to the environment that prevails during the preferred use of the fibers according to the invention, namely, during the firing of a wire guided device, such as a missile which discharges water vapor at a high temperature in the exhaust gas from its engine.

According to the invention, the compound or compounds capable of being released under said defined conditions is/are chosen from among compounds capable of causing a degradation of the coating.

This/these compound(s) is/are chosen, for example, from among the organic solvents and the water sensitive compounds.

Preferably, said compound is a water sensitive. compound, that is to say, a compound which, notably under the conditions mentioned above, will, on contact with water, be converted into a compound, such as an acid, that will cause the degradation.

The compound imprisoned by the calixarene will be chosen preferably from among methylene chloride, ethylmethyl ketone and their mixtures.

The water sensitive compound will, for example be $SO_3$.

The liberated $SO_3$ on coming into contact with water molecules, is converted into sulfuric acid which is a particularly effective agent for degrading the coating. The water is naturally present notably both in the atmosphere, and in the gases discharged from the jet engine.

All the compounds mentioned give sufficient degradation (as has been defined above) of the fiber within a time period of a few hours, preferably less than or equal to 6 hours, for example, in 1 hour, counting from the start of their release, for example, at the time the missile is fired. Nevertheless, this degradation time is sufficiently long and does not affect the fundamental optical and mechanical properties of the fiber when fired.

By an imprisoned compound, one understands that each molecule of calixarene can imprison one or more molecules of a compound and/or one or more chemical entities derived from this compound. By chemical entities one understands, for example, the ions, or the radicals stemming from said compound or others.

In addition, each molecule of calixarene can imprison one or more different or identical compounds.

By way of example, in the case of $SO_3$ and the calixarene of formula (I), this can imprison six molecules of $So_3$.

The polymer is chosen, preferably from among the traditional organic polymers that form the coating of optical fibers.

The organic polymer is preferably chosen from among the epoxy-polyacrylates and the epoxy-polyurethanes.

The coating may be formed by one or more layers of said organic polymer, for example, two layers.

The thickness of said coating is a few tens of micrometers, for example, 60 µm. Similarly, the thickness and the nature of the core and of the sheath are those of traditional, non self-degradable, optical fibers.

The optical fiber according to the invention is preferably a single mode optical fiber, which is that preferably used for the guidance of missiles, but the optical fiber of the invention can be any optical fiber comprising a coating or a protective coating for the sheath and the core, namely, for example, a single mode fiber with an index difference or with a graded index.

In fact, the self-degradable optical fibers of the invention are distinguished from non self-degradable traditional fibers simply by the fact that a calixarene imprisoning a compound, as defined above, is included in the coating or the protective coating.

In addition, the invention relates to a method of preparing the optical fiber described above. This method essentially comprises the preparation of a preform, the melting of said preform, the drawing of said molten preform through a die to form a glass thread, passage of said glass thread through a coating application die to cover it with a coating, the polymerization of said coating, and the winding of the fiber obtained, a calixarene imprisoning a molecule of a compound capable of being released under defined conditions of temperature, humidity and, possibly irradiation being introduced into the coating application die to be mixed with the polymer there, and the winding operation being carried out outside said conditions of humidity, temperature and possibly irradiation.

The method according to the invention is totally reliable and controlled and enables homogenous incorporation of the calixarene into the polymer. According to the invention, the winding operation (or spooling) is preferably carried out under controlled conditions of humidity, temperature and exposure to radiation, for example, irradiation by ultra-violet light.

It should be noted that storage of the fiber, for example, of the missile that incorporates it, must be under the same conditions: for example, in a closed, opaque container, in a atmosphere dried by a suitable compound, such as silica gel or other compound, so as not to cause premature release of the compound causing the degradation.

The fibers according to the invention can be stored in this way for years without any problem and at the time of their use have the desired using properties as well as the property of subsequent degradation.

The calixarene imprisoning the compound described above, is introduced continuously or in a non-continuous manner into the coating application die, in the form of a solid, for example, in the form of a finely divided powder or in the form of a solution in a suitable organic solvent, such as an aliphatic alcohol, for example comprising 1 to 6 carbon atoms, such as methanol, ethanol, propanol etc. or a mixture of them.

Proceeding in this way, a more homogeneous distribution of the calixarene is obtained in the coating.

Finally, the invention relates to the wire guided device, such as a missile comprising the optical fiber, described above, for example, wound on a spool or other winding device.

The invention will now be described in a more precise manner in the description that will follow given for information purposes, being non-limitative and referring to the appended drawings in which:

In FIG. 5, the degradation has been triggered;

FIGS. 7, 8 and 9 show the state of degradation of these fibers after one hour of exposure to water vapor.

Figure 1:
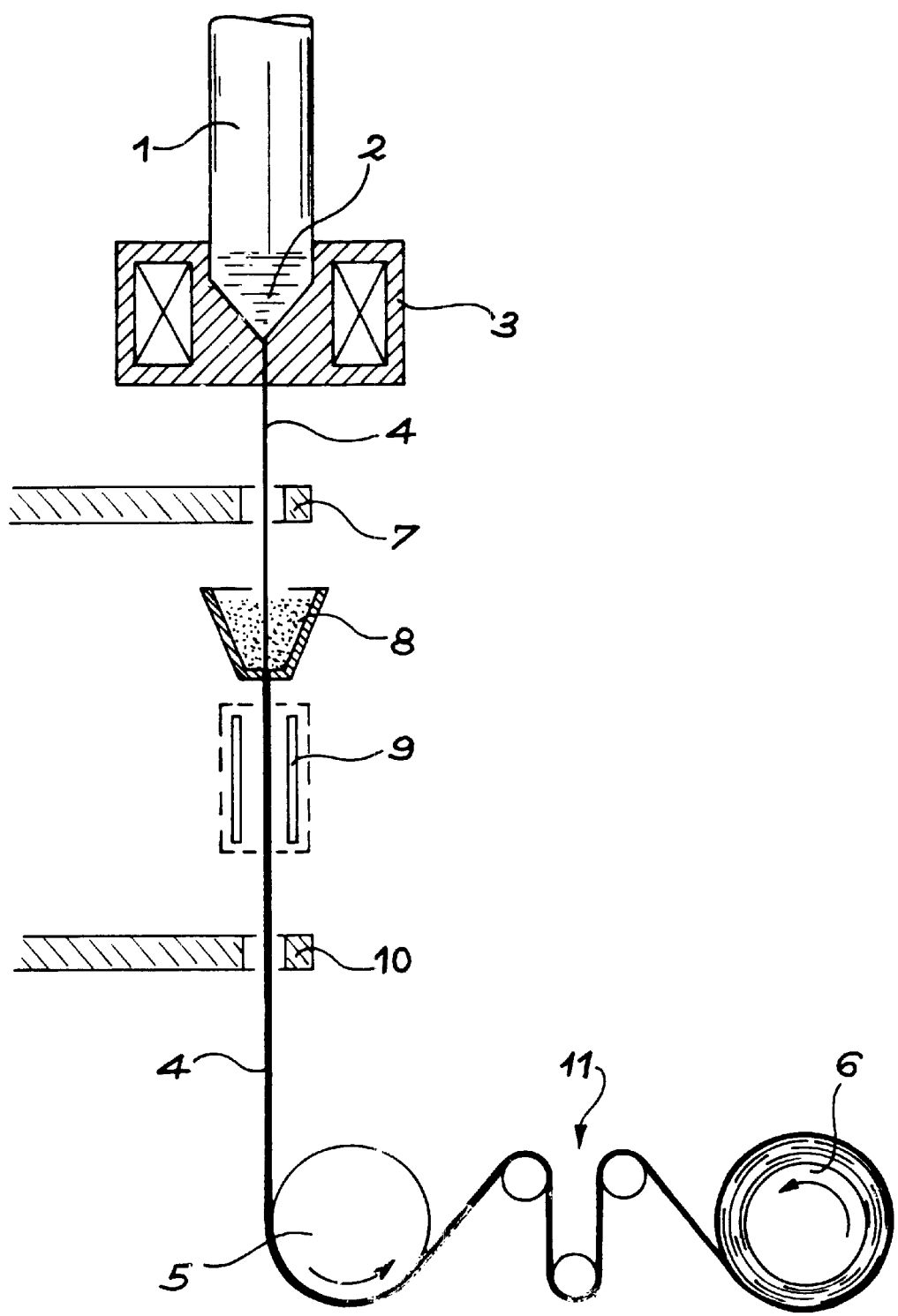
FIG. 1 is a functional diagram describing the method of manufacturing an optical fiber according to the invention.

FIG. 1 describes the method of manufacturing an optical fiber according to the invention, also called "drawing".

The method described in FIG. 1 permits incorporation, in the coating of the optical fiber, of the calixarene imprisoning the molecule leading to the degradation of the fiber, and thereby enables one to obtain a fiber according to the invention.

The optical fiber which is prepared by this method is preferably an optical fiber, called a single mode fiber, which is the fiber preferably used in the preferred application of the invention for the guidance of wire guided missiles. However, the preparation of any type of optical fiber, which has, according to the invention, the capability of self-degradation, is also possible by this method, for example, multiple mode fibers with an index difference or multiple mode fibers with a graded index.

The first step in the manufacturing of the optical fiber is the preparation of a preform (1). In effect, since the manufacture of a glass thread a few tens of microns or less in diameter is not possible, it is first necessary to define the characteristics of the preform from the desired characteristics of the fiber.

The preform (1) is an image of the fiber, only the dimensions are multiplied by a coefficient, for example, of the order of 320.

The values of the indices of the core and of the sheath are in every way identical to those of the fibers.

The end (2) of the preform (1) is brought to the melting temperature in an induction furnace (3). A thread of molten glass (4) comes out from the fusion cone (3) and is drawn using a capstan (5) in order to be wound on a winder (6).

Between the induction furnace (3) and the capstan (5), there are successively:

a fiber diameter sensor (7) which servo-drives the speed of the fiber (4) at the speed of descent of the preform. The temperature of the furnace being controlled at 2100° C. The accuracy of the sensor (7) is of the order of half a micrometer;

a coating application die (8) the role of which is to cover the glass thread with a coating which will provide mechanical reinforcement and protection for the fiber against $OH^-$ ions.

a UV chamber (9) for the polymerization of this coating. However the polymerization may also be carried out in the open air by heating to temperatures generally between 50 and 200° C., and the chamber (9) is then omitted;

a diameter sensor (10) for automatic control of the coating application die, the diameter of the coating having to remain constant.

Preferably, two coats are applied to form the coating, of substantially equal thickness, an internal coat with a low modulus of elasticity (about 2 MPa) and an external coat with a high modulus (600 to 800 MPa).

This assembly provides a more effective protection than the application of a single coat. In effect, in the latter case, the internal layers of the material receive less energy than those close to the surface, which creates heterogeneity in the coating. Nevertheless, it is obvious that fibers that only comprise one coat may also be prepared.

So as to prepare the fiber according to the invention, the calixarene that imprisons a molecule capable of being released and capable of degrading the coating is preferably introduced in the coating application die where it is mixed with the polymer.

This operation can be carried out in a continuous or a non-continuous manner. The calixarene that imprisons the molecule capable of degrading the coating is present in the polymer, in a homogeneous manner. Said calixarene can be introduced into the die in the form of a powder, preferably finely ground, for example, in the case of a calixarene imprisoning $SO_3$.

The calixarene can also be introduced into the die, in the form of a solution in a suitable solvent, for example, methanol.

The proportion of calixarene in this solution is generally from 1/1000 to 20% by weight. Such a method of introduction is as applicable to calixarenes imprisoning $SO_3$ as to those imprisoning $CH_2Cl_2$ or ethylmethyl ketone.

The last piece of equipment before the winder (6) is a continuously operating tensioning device (11) which applies a force, for example, of 500 g to the fiber so as to eliminate points of weakness which would lead to fractures during wiring or spooling operations, and during the positioning of these wires or during the unwinding of the spools.

The speed of the fiber making is generally from 80 to 120 meters per minute depending on the length of the preform. The standard length of the fiber, leaving the fiber making tower, is of the order of several tens of km, preferably 100 km.

The invention will now be described with reference to the following examples given for illustration purposes only which are non-limitative.

EXAMPLE 1

In this example, fibers are prepared that include calixarenes of formula (I) using a fiber making apparatus that enables one to incorporate said calixarenes, with the molecules that they imprison, in the coating, before the coating is polymerized.

The fiber making apparatus used is substantially analogous to that described above and in FIG. 1.

This fiber making apparatus allows one to obtain fibers that have a uniform coating of epoxy polyacrylate of a thickness of about 50 μm comprising calixarenes, said calixarenes imprisoning $SO_3$ or methylene chloride.

Three types of self-degradable fibers were produced; all had epoxy polyacrylate as the main coating ingredient:

fiber with finely ground calixarene powder imprisoning $SO_3$;

fiber prepared with a solution of calixarenes imprisoning $SO_3$ mixed with methanol, which is acting here as a solvent;

fiber with a solution of calixarenes, imprisoning $CH_2Cl_2$ mixed with 20% methanol.

EXAMPLE 2

The three types of fiber prepared in example 1 were tested for their self-degradation properties by exposing them to water vapor at 100° C. for a few seconds.

The results obtained during these tests of exposure to water vapor are collected together in Table I below.

TABLE I

| Type of self degradable fiber | Fiber with calixarene powder imprisoning $SO_3$ | Fiber with calixarene imprisoning $SO_3$, in methanol | Fiber with calixarene imprisoning $CH_2Cl_2$ in methanol |
|---|---|---|---|
| Results obtained after exposure to water vapor | Samples corroded, fractured under tensile load in 5 hours | Samples corroded, fractured under load in 1 hour | Coating detached from the fiber after 1 hour |

As can be observed in Table I, these results are satisfactory since all the fractures occurred within the desired time period.

The different samples of fibers obtained at the end of the exposure to the water vapor were studied using a scanning electron microscope.

Figure 2:
FIG. 2 is a photograph taken with a scanning electron microscope of a self degradable fiber according to the invention comprising calixarenes of formula (I) imprisoning $SO_3$, which has not been exposed to water vapor.
Figure 3:
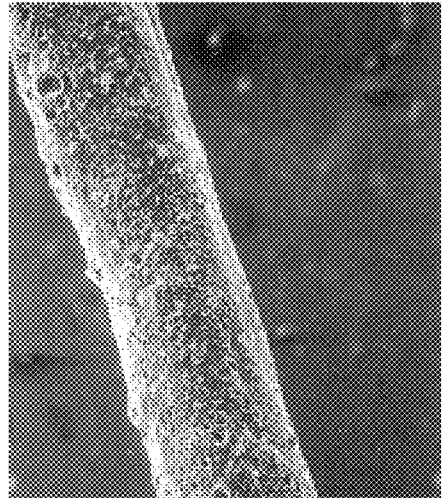
FIG. 3 is a photograph taken with a scanning electron microscope of the same fiber after five hours of exposure to water vapor.
Figure 4:
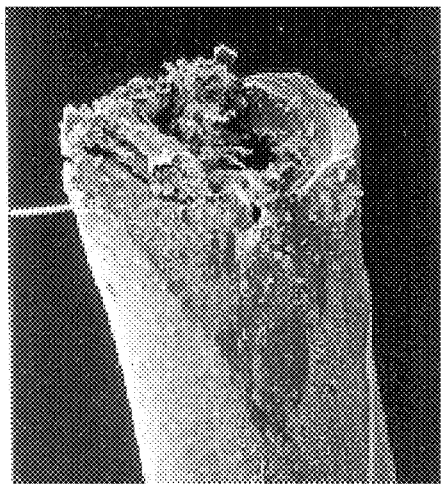
FIG. 4 is a photograph taken with a scanning electron microscope of the area of fracture of the same self degradable fiber.

FIGS. 2, 3 and 4 relate to observations made on the fibers comprising the calixarene powder imprisoning $SO_3$.

FIG. 2 is a photograph of an unexposed self-degradable fiber, FIG. 3 is a photograph of a fiber, five hours after exposure, and FIG. 4 is a photograph of the fracture zone of the self-degradable fiber.

In FIG. 3, the effects of the sulfuric acid, already met with in example 1, can be clearly observed. This time, they take the form of holes since the calixarenes have been introduced into the fiber in the form of a powder, and therefore non-uniformly.

From FIG. 4, it may also be noted that the breaking pattern of the fiber is not straight and level, and that it has been eaten into by the sulfuric acid.

Figure 5:
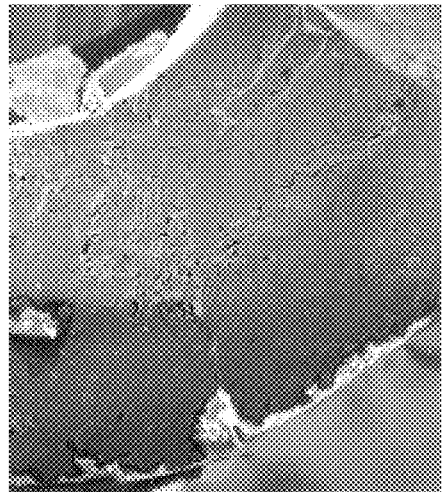
FIG. 5 is a photograph taken with a scanning electron microscope of a front elevation of a self degradable fiber according to the invention, in which the calixarenes imprisoning the $SO_3$ have been diluted with methanol before their incorporation into the coating.
Figure 6:
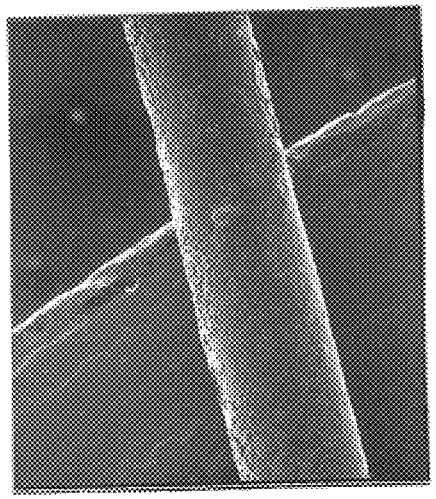
FIG. 6 is a photograph taken with a scanning electron microscope of the same fiber, seen from the side.

FIGS. 5 and 6 relate to observations made on fibers in which the calixarenes imprisoning the $SO_3$ have been diluted in methanol before being incorporated into the coating.

FIG. 5 is a photograph representing a self-degradable fiber, the degradation of which has been initiated, viewed from the front.

FIG. 6 is a photograph of the same fiber taken from the side.

In FIGS. 5 and 6, fine cracking of the coating as far as the core of the fiber is observed. Compared with the previous case, this is explained by the fact that here, the acid is distributed uniformly within the coating.

Figure 7:
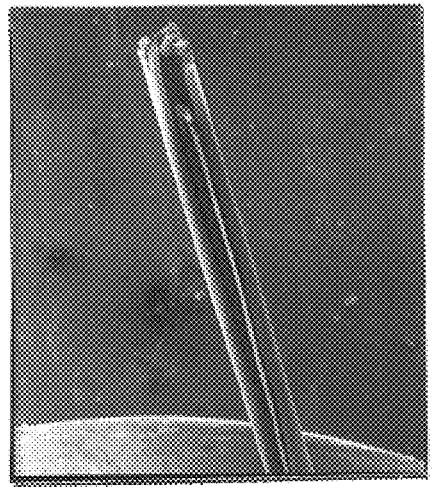
FIGS. 7, 8 and 9 are scanning electron microscope photographs of fibers according to the invention, in which the calixarenes imprisoning $CH_2Cl_2$ have been diluted in methanol before their incorporation into the coating.
Figure 8:
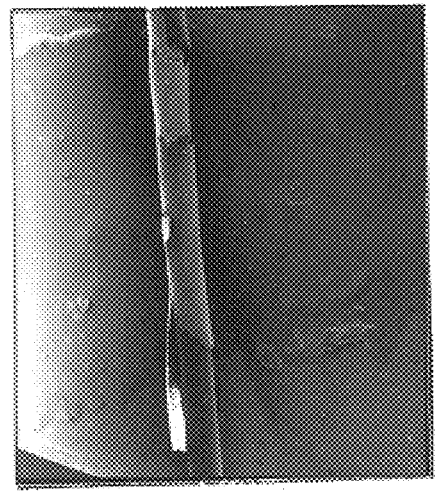
Figure 9:
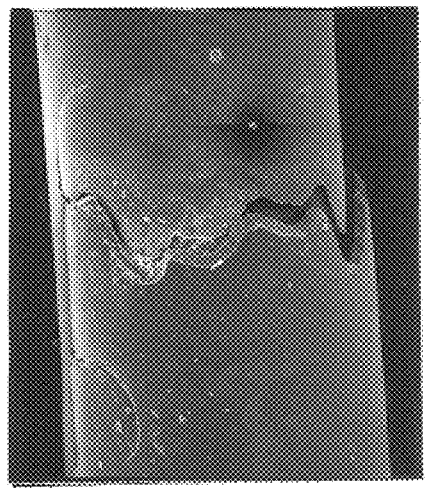

FIGS. 7, 8 and 9 relate to observations made on fibers in which calixarenes imprisoning $CH_2Cl_2$ have been diluted in methanol before being incorporated into the coating.

FIGS. 7, 8 and 9 are photographs showing the state of these fibers at the end of an hour.

This time, a different form of attack is seen, since it may be observed that the coating is detached from the core of the fiber. Furthermore, a clear cracking of the epoxy polyacrylate is also apparent.

The group of results shown above in example 2 show clearly that the optical fibers according to the invention are self-degradable, within the desired time period and using a "trigger" particularly well suited to the environment in which these fibers are used, in particular, the environment of a missile since a missile discharges water vapor at a high temperature.

In examples 3 and 4 below, the fibers above are exposed to various conditions, so as to check that their performance remains identical to that of traditional fibers which are not self-degradable, notably under conditions which are those for the storage and the flight of a missile.

EXAMPLE 3

In this example, exposure of fibers to an atmosphere at variable relative humidity is studied; the temperature remaining ambient and constant.

Since the degradation process has to be activated by bringing the calixarenes present in the sheath of the fiber into contact with molecules of water, a series of tests in an atmosphere of variable relative humidity was set up so as to control the speed of degradation and thereby allow the missile to move within all types of environment.

In fact, it emerges that as long as the fiber is not placed under conditions of humidity, for example saturated humidity, essentially combined with significant heating, the fiber remains insensitive to the environmental conditions.

This means that the self-degradable optical fibers according to the invention behave like "normal" optical fibers and that their mechanical strength therefore remains sufficient for the preferred use for the guidance of missiles.

EXAMPLE 4

In this example, the exposure of the fibers to mechanical stresses is studied.

The final series of tests which have been carried out relate to stresses of the mechanical kind to which the fiber is subjected.

In effect, they were carried out to check that the fiber preserves good mechanical behavior during the firing of the missile.

All the tests were carried out in such a way that comparisons could be made with non self degradable fibers so that the possible benefits offered by the self degradable fibers could be appreciated.

Results of tensile strength tests have shown that there was no variation in mechanical strength between these two types of fiber, under normal conditions of use, that is to say, outside the conditions defined above for degradation.

What is claimed is:

1. Optical fiber comprising a core, a sheath, and a coating made of polymer, in which at least one calixarene imprisoning at least one compound capable of being released under defined conditions of temperature, and/or humidity and/or irradiation, and of producing a degradation of the coating, is incorporated in said coating.

2. Optical fiber according to claim 1, in which said at least one calixarene is chosen from among the calixarenes comprising from 4 to 10 phenol rings, possibly substituted.

3. Optical fiber according to claim 2, in which said calixarene is chosen from among the calixarenes comprising 4, 5, 6 and 8 phenol rings, that is to say calix[4]arene, calix[5]arene, calix[6]arene and calix[8]arene.

4. Optical fiber according to claim 3, in which said phenol rings are substituted by one or more substituents chosen from among the linear or branched alkyl groups and alkenyl, aryl and aralkyl groups.

5. Optical fiber according to claim 2, in which said phenol rings are substituted by one or more substituents chosen from among the linear or branched alkyl groups and alkenyl, aryl and aralkyl groups.

6. Optical fiber according to claim 5, in which all the phenol rings are substituted in the para position by one and the same substituent chosen from among the linear or branched alkyl groups with from 1 to 6 carbon atoms.

7. Optical fiber according to claim 6, in which said substituent is a tertiary butyl group.

8. Optical fiber according to claim 7, in which said calixarene is t-butyl calix arene.

9. Optical fiber according to claim 8, in which said compound is released under defined combined conditions of humidity and temperature.

10. Optical fiber according to claim 9, wherein the defined combined conditions further include irradiation.

11. Optical fiber according to claim 10, wherein the irradiation is ultra violet irradiation.

12. Optical fiber according to claim 1, in which said compound is released under defined combined conditions of humidity and temperature.

13. Optical fiber according to claim 12, in which said conditions of humidity and temperature are those met with at the outlet from the engines of guided devices.

14. Optical fiber according to claim 12, wherein the defined combined conditions further include irradiation.

15. Optical fiber according to claim 14, wherein the irradiation is ultra violet irradiation.

16. Optical fiber according to claim 1, in which said compound or compounds capable of being released is/are chosen from among the solvents and the water sensitive compounds.

17. Optical fiber according to claim 16, in which said compound is chosen from among ethylmethyl ketone, methylene chloride, and their mixtures.

18. Optical fiber according to claim 17, in which said polymer is an organic polymer.

19. Optical fiber according to claim 18, wherein the organic polymer is chosen from among the epoxy polyacrylates and the epoxy polyurethanes.

20. Optical fiber according to claim 16, in which said water sensitive compound is $SO_3$.

21. Optical fiber according to claim 1, in which said polymer is an organic polymer.

22. Optical fiber according to claim 21, in which said coating is made up of two layers.

23. Optical fiber according to claim 21, wherein the organic polymer is chosen from among the epoxy polyacrylates and the epoxy polyurethanes.

24. Optical fiber according to claim 1, in which said coating is made up of two layers.

25. Optical fiber according to claim 24, which is a single mode optical fiber.

26. Optical fiber according to claim 1, which is a single mode optical fiber.

27. Method of preparation of the optical fiber according to claim 26, comprising essentially the preparation of a preform, the melting of said preform, the drawing of said molten preform through a die to form a glass thread, passage of said glass thread through a coating application die to cover it with a coating, the polymerization of said coating, and the winding of the fiber obtained, a calixarene imprisoning a molecule of a compound capable of being released under defined conditions of temperature, humidity and, possibly irradiation being introduced into the coating application die to be mixed with the polymer there, and the winding operation being carried out outside said conditions of humidity, temperature and possibly irradiation.

28. Wire guided device comprising an optical fiber according to claim 26.

29. Method of preparation of the optical fiber according to claim 1, comprising essentially the preparation of a preform, the melting of said preform, the drawing of said molten preform through a die to form a glass thread, passage of said glass thread through a coating application die to cover it with a coating, the polymerization of said coating, and the winding of the fiber obtained, a calixarene imprisoning a molecule of a compound capable of being released under defined conditions of temperature, humidity and, possibly irradiation being introduced into the coating application die to be mixed with the polymer there, and the winding operation being carried out outside said conditions of humidity, temperature and possibly irradiation.

30. Method according to claim 29, in which the winding operation is carried out under controlled conditions of humidity, temperature and exposure to radiation.

31. Optical fiber according to claim 30, wherein the radiation is ultra violet light radiation.

32. Method according to claim 29, in which said calixarene is introduced into the coating application die in solid form.

33. Method according to claim 32, in which said calixarene is introduced into the die in the form of a finely divided powder.

34. Method according to claim 29, in which said calixarene is introduced into the coating application die in the form of a solution.

35. Method according to claim 34, in which said solution is a solution in an aliphatic alcohol comprising from 1 to 6 carbon atoms.

36. Wire guided device comprising an optical. fiber according to claim 1.

* * * * *